United States Patent [19]

Tourtier et al.

[11] Patent Number: 5,202,760
[45] Date of Patent: Apr. 13, 1993

[54] INFORMATION COMPRESSION METHOD AND DEVICE FOR COMPATIBLE DECODING OF A GROUP OF TELEVISION SIGNALS WITH INCREASING RESOLUTIONS

[75] Inventors: Philippe Tourtier, Rennes; Yves-Marie Le Pannerer, St Gregoire, both of France

[73] Assignee: Thomson-CSF, Puteaux, France

[21] Appl. No.: 582,920

[22] PCT Filed: Feb. 13, 1990

[86] PCT No.: PCT/FR90/00101

§ 371 Date: Oct. 22, 1990

§ 102(e) Date: Oct. 22, 1990

[87] PCT Pub. No.: WO90/10353

PCT Pub. Date: Sep. 7, 1990

[30] Foreign Application Priority Data

Feb. 21, 1989 [FR] France .................. 89 02235

[51] Int. Cl.⁵ .................. H04N 7/00; H04N 7/12
[52] U.S. Cl. .................. 358/141; 358/12; 358/133; 358/310
[58] Field of Search .................. 358/133, 141, 142, 12, 358/310, 335

[56] References Cited

U.S. PATENT DOCUMENTS

| | | |
|---|---|---|
| 4,665,436 | 5/1987 | Osborne et al. |
| 4,829,378 | 5/1989 | LeGall ............... 358/133 |
| 4,913,524 | 4/1990 | Ansari et al. ............... 358/133 |
| 4,979,049 | 12/1990 | Chamzas et al. ............... 358/133 |
| 5,048,111 | 9/1991 | Jones et al. ............... 358/133 |
| 5,050,230 | 9/1991 | Jones et al. ............... 358/133 |
| 5,067,015 | 11/1991 | Combridge et al. ............... 358/133 |

FOREIGN PATENT DOCUMENTS 0293041 11/1988 European Pat. Off.
8706418 10/1987 World Int. Prop. O.

OTHER PUBLICATIONS

The Sampling of Television Images; by G. J. Tange May 1981 (IBA Experimental of Development Report 112/81).

Frequenz, vol. 37, Nos. 11/12, Nov./Dec. 1983, H. Sauerburger et al: "Verarbeitung und digitale Codierung von HDTV-Signalen" pp. 288-299.

Rundfunktechnische Mitteilungen, vol. 28, No. 5 Sep.-/Oct. 1984, F. Stollenwerk et al.: "Fernsehsysteme mit kompatibel erhöter Bildqualität-ein Systemvergleich", pp. 224-234.

IEEE Global Telecommunications, Conference, Houston, Texas, Dec. 1986, vol. 2, IEEE, J. A. Bellisio et al.: "Television coding for broadband ISDN", pp. 894-900.

Primary Examiner—James J. Groody
Assistant Examiner—Michael H. Lee
Attorney, Agent, or Firm—Oblon, Spivak, McClelland, Maier & Neustadt

[57] ABSTRACT

The method of the present invention is directed to information compression which allows for compatible decoding of a group of television signals with increasing resolutions. According to the present invention, a first step, at the transmitter, involves strobing the space frequency band of the signal to be transmitted which has the highest resolution into adjacent subbands. Then, the signal with the highest resolution to be transmitted is independently coded in each subband. The subbands are then multiplexed by separating the coded signals in each subband by means of non-imitable synchronizing patterns. At the receiving decoder, the signals received relative to each subband are decoded only taking into consideration those which are necessary in order to reconstitute at least one member of a resolution group. The present invention finds particular application in the transmission system for high-definition TV images.

11 Claims, 8 Drawing Sheets

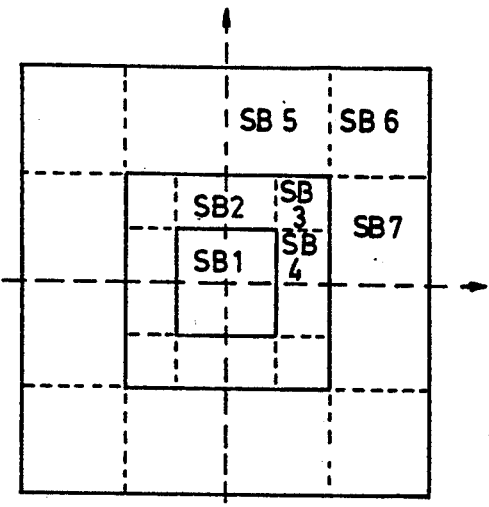
FIG. 11
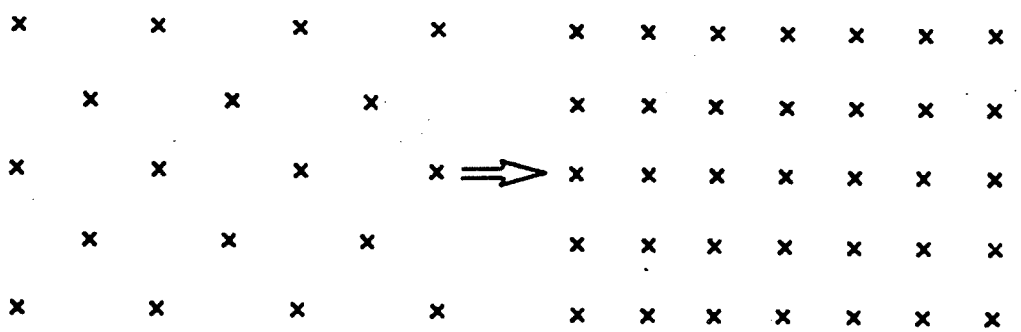
FIG. 12
FIG. 14

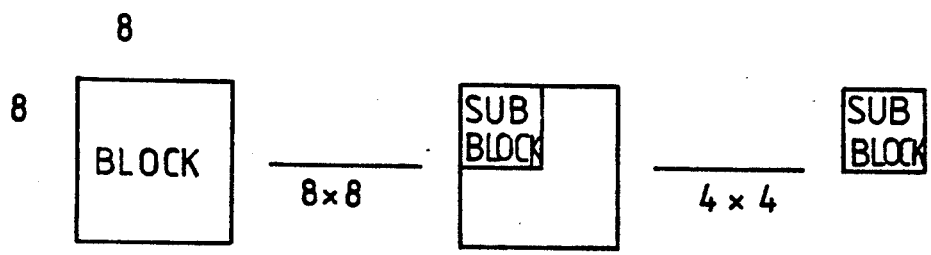
FIG. 16
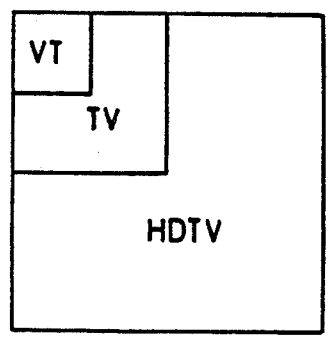
FIG. 17
```
 0   2   4   9  16  18  19  35
 1   3   8  10  17  20  34  36
 5   7  11  14  21  33  37  48
 6  12  13  15  32  38  47  49
22  24  25  31  39  46  50  57
23  26  30  40  45  51  56  58
27  29  41  44  52  55  59  62
28  42  43  53  54  60  61  63
```
FIG. 18

INFORMATION COMPRESSION METHOD AND DEVICE FOR COMPATIBLE DECODING OF A GROUP OF TELEVISION SIGNALS WITH INCREASING RESOLUTIONS

BACKGROUND OF THE INVENTION

1. Field of the Invention

The present invention relates to an information compression method and device for compatible decoding of a group of television signals with increasing resolutions. It applies more particularly to digital video-signal transmitting and receiving systems and to digital video recorders.

2. Description of the Prior Art

As is well-known in the art, to reduce the information flow in information compression devices, the digitized image is coded by using a cosine-type two-dimensional transformation, according to Fourier, Hadamard, Haar, or Karhunen-Loeve. Transform coding enables the use of the statistical properties of the image source and the observers' psychovisual aptitude. As the number of operations required to obtain these codings increases rapidly in relation to the size of the image, the latter is divided into windows or blocks and the transformation is applied to each of the window pixels. This two-dimensional transformation means that the same number of coefficients are obtained as there are pixels in each block of images.

Flow reduction is obtained by quantifying the coefficients and by describing the sequence of obtained values with the assistance of a variable length code. Due to the fact that this final operation produces a variable flow, and that the television channel has a steady flow, a buffer memory is added to the coder output to guarantee a regular flow of information through the coder.

Decoding consists in deciphering variable-length received code words in order to discover the original two-dimensional transformation coefficients, then, in restoring the digital values for each image element, by applying to the transformation coefficients corresponding to each image block, the inverse two-dimensional transformation of the one originally used for coding. The transformations which are used in practice are those for which there exist rapidly performed algorithms, as is the case, for example, with cosine-transformation coding algorithms, for which descriptions may be found in French patent applications No. 2575351 or 8718371 registered under the name of the Applicant. Generally speaking, such systems can be applied to images for which the resolution is known in advance, with the number of lines and points per line previously defined, as for example 720 points for 576 lines, defined in the CCIR recommendation 661. But, in parallel to this type of resolution, there exist other types of resolution, such as those of high-definition television, described, for example, in the article by J. CHATEL entitled "Compatible Hierarchy of Studio standards" Conf. SMPTE San Francisco Feb. 1-3, 1989 and reduced 288-line, 360-point resolution for applications requiring a lower-quality image, as for example, the videophone. This diversity of resolutions implies a diversity in both coding and decoding systems as well as complications in the management of satellite or radio channel links which have, in some cases, to retransmit as many audio-visual programs as there are systems. It also imposes restrictions on users who may need to change TV receivers in order to benefit from the image quality offered by high-definition television.

SUMMARY OF THE INVENTION

The objective of this invention is to reduce the inconveniences mentioned above.

For this purpose, the object of this invention is a method of information compression for compatible decoding of television signals with increasing resolutions, whereby the signals are transmitted between at least a transmitting encoder and a receiving decoder, consisting in:

at the transmitting coder strobing the spatial frequency band of the signal to be transmitted with the highest resolution into adjacent subbands;

independently coding the signal in each subband;

multiplexing subbands by separating the coded signals in each subband according to non-imitable synchronizing patterns;

and at the receiving decoder decoding the received signals relative to each subband while considering only those needed to reconstitute at least one member of a resolution group.

A further objective of this invention is a device for applying the above-mentioned method and the use of this device for transmitting television images on to videorecorders.

The main advantages of this invention are that it guarantees both upward and downward compatibility between television systems based on different resolutions. For example, it enables receiving decoders for 625 and 525-line television standards to decode signals with lower resolution, used by videophones for example, or even to decode high-definition television signals. This invention also guarantees compatibility between 625 and 525-line standard television distribution and digital video recorders whereby, so that fast forward and fast rewind modes may run correctly, the type of compression must be nonrecursive (in other words, image coding must occur during intraframe mode, without making use of past coding).

BRIEF DESCRIPTION OF THE DRAWINGS

Further characteristics and advantages of the invention will become apparent by means of the following description made in relation to the appended diagrams which are:

FIGS. 11 to 13, the decomposition of a high-definition signal into several subbands obtained, according to a second mode of embodiment of the invention, by means of orthogonal filters;

FIG. 14, an illustration of a method of oversampling used in the invention to go from a quincuncial image structure to an orthogonal image structure;

FIGS. 16, 17 and 18, an illustration of a third mode of embodiment of a method for strobing high-definition signal spectra into subbands by means of dividing the coefficients of a cosine-type two-dimensional transformation into sub blocks.

DESCRIPTION OF THE PREFERRED EMBODIMENTS

In existing television systems of the same type as those described, for example, in the article by M. M. Wendland Schroëder entitled "On Picture Quality of some Television Signal Processing Techniques" published in the SMPTE journal in October 1984 or in the articles by Jean CHATEL entitled "Toward a World Studio Standard for High Definition TV" published in the IBC journal 1988 and "Compatible Hierarchy of studio standards" (SMPTE conf. 1st Feb. 1-3 1979, San Francisco), the high-definition television signal is defined by the fact that it contains twice the number of lines and points per line as the currently existing television signal of 625 or 525-line systems. This high definition signal (HD) which is still known under the abbreviation HDP meaning "High Definition Progressive" indicates a definition corresponding to 1920 points per line and 1152 lines which is double the resolution of the television system known under the abbreviation EDP meaning "Enhanced Definition Progressive" for which the definition corresponds to 576 lines of 960 points. In an intermediate position is the HDQ system meaning "High Definition Quincunx", with 1152 lines of 960 points which are placed in quincuncial form from one line to another as is described and presented in the articles by Jean CHATEL quoted previously. There also exist other systems with lower resolutions. For example, the EDQ system, meaning "Enhanced Definition Quincunx" and the "VT" system meaning "Video Telephone". The EDQ system defines the image in 576 lines with 480 points per line, in quincuncial form, and the VT system defines the image in 288 lines with 480 points.

Figure 1:
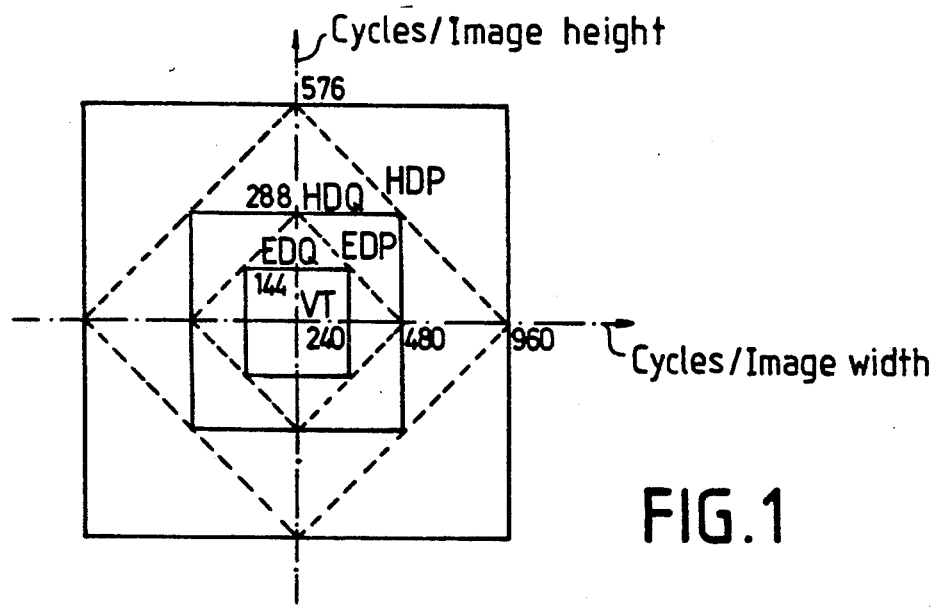
FIG. 1, a diagram illustrating spectral zone imbrication as occupied by the various television standards with different resolutions.
Figure 2A:
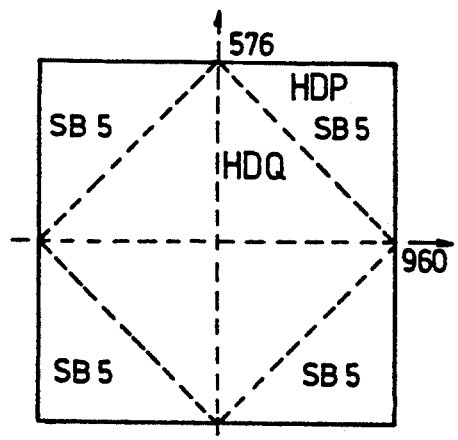
FIGS. 2-7, examples of image decomposition from a high-definition standard represented in the form of other sub images with lower resolutions.
Figure 3A:
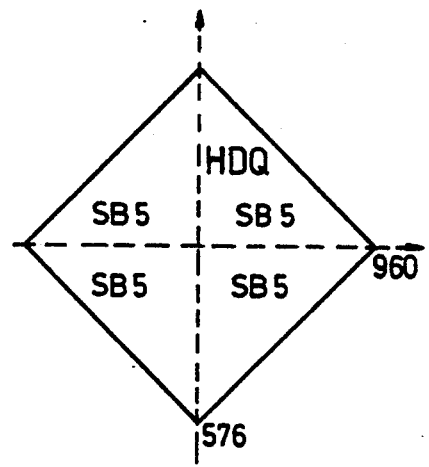
Figure 2B:
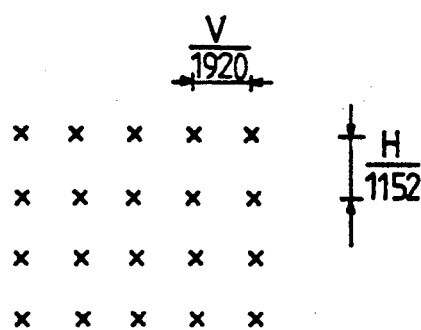
Figure 3B:
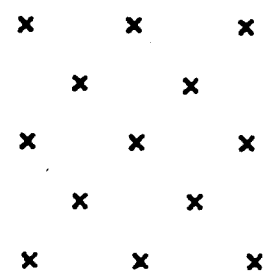
Figure 4:
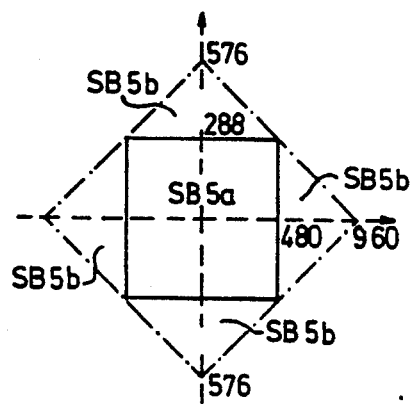
Figure 5:
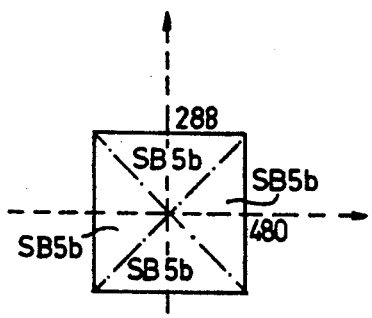

The compared spatial resolutions of these systems are presented in the orthonormal plane of FIG. 1, where the horizontal spatial frequencies of the image are plotted on the x-axis measured by the number of cycles per image width, and the vertical spatial frequencies are plotted on the y-axis measured -by the number of cycles per image height. It is to be seen on this diagram that the spectral zones defined by the orthogonal sampling systems of HDP, EDP and VT signals are rectangles whereas the zones defined by HDQ and EDQ quincunx systems are lozenge-shaped. These zones all fit in with one another. The pass bands of HDP and HDQ systems are limited to 960 cycles per image width and to 576 cycles per image height. Pass bands in HDQ and EDP systems are limited to 480 cycles per image width and 288 cycles per image height and those of a VT system are limited to 240 cycles per image width and 144 cycles per image height. With this imbrication, the cut-off frequencies providing horizontal and vertical limits to each zone are the corresponding multiples of two for VT system cut-off frequencies (240 cycles per image width and 144 cycles per image height).

Based on the remark above, this invention consists in decomposing the image into frequency subbands by means of spatial filters according to an existing subband coding method assisted by orthogonal and diagonal filters such as those described, for example, in the article by M. M. Wendland Schroëder quoted previously. The decomposed bands either represent one of the signal resolutions, if for example the VT band is being coded, or when combined enable one of the previously mentioned resolutions, EDQ, EDP, HDQ or HDP to be reconstituted.

Figure 6:
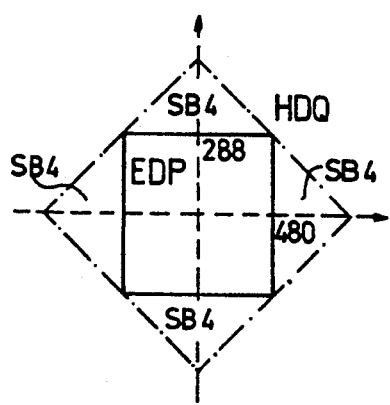
Figure 7:
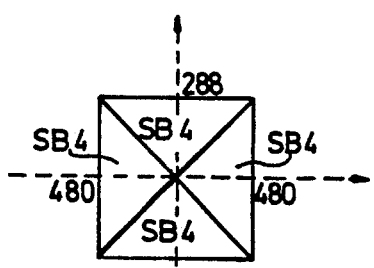

In order to decompose the image into frequency bands the following principle is applied, illustrated by FIGS. 2a to 7. The HDP signal spectrum in FIG. 2a corresponds to the orthogonal sampling structure described in FIG. 2b. Successive sampling on one line is carried out at a distance V/1920 between two samples and the lines are at a distance H/1152 from each other, V and H represent respectively the width and the height of the image. The HDP signal spectrum is then filtered by means of a diagonal filter, for which the band spectrum is defined in FIG. 3a by a lozenge. This signal which has a limited pass band is decribed using a quincuncial structure of the same type as that described in FIG. 3b. This structure corresponds to structure in FIG. 2b. As the quincuncial structure in FIG. 3b is not well adapted for cosine transformation-type coding, it is transformed into a double orthogonal structure as presented in FIGS. 6 and 7. The HDQ signal with a lozenge-shaped spectrum and quincuncial structure is first filtered in rectangular format and then marked in the lozenge corresponding to the EDP signal. The signal obtained can still be described by means of an orthogonal structure obtained by sub-sampling of the HDQ structure in conformity with FIG. 3c. In FIG. 6, the difference between spectrums HDQ and EDP is a spectrum which forms a frequency subband SB4 and the shape of this spectrum is four points forming a diamond with no low frequencies. This spectrum may, in turn, be sub-sampled according to the structure presented in FIG. 3c, thus producing the spectrum presented in FIG. 7.

In the same manner, a frequency subband SB5 is obtained from the HDP signal by subtracting the spectrum occupied by the HDQ signal from the spectrum occupied by the HDP signal. This subband SB5 can be sub-sampled according to a quincuncial structure of the same type as that presented in FIG. 3b, in order to obtain a lozenge-shaped spectrum. This spectrum can be reduced further by means of the above-mentioned method to two rectangular spectra forming subbands SB5a and SB5b, as presented in FIGS. 4 and 5.

By means of diagonal or orthogonal filters, the embodiment of which is well-known, the method previously described enables an HDP signal formed by 1152 lines with 1920 points per line to be reduced to a series of subbands SB1, SB2, SB3a, SB3b, SB4, SB5a, SB5b, with rectangular spectrum structures described by either 960 points and 576 lines for bands SB5a, SB5b, SB4, or by 480 points and 288 lines for bands QSB1, SB2, SB3a, SB3b.

Figure 8:
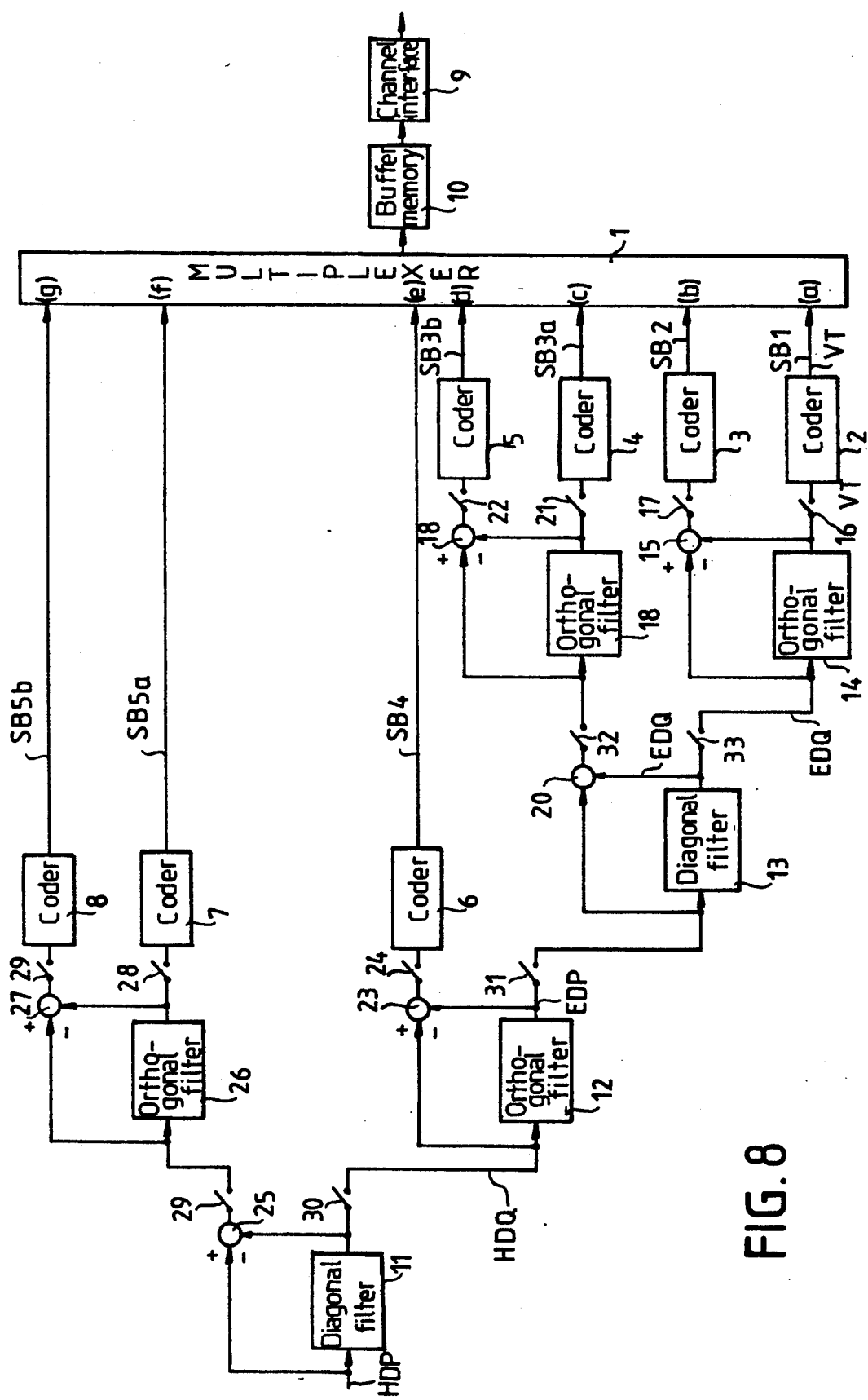
FIG. 8, a mode of embodiment of the coder according to the invention.

The sub-images of rectangular spectrums may be coded separately by means of the cosine-transform compression method or any of the two-dimensional type transformations previously quoted. FIG. 8 illustrates a coder functioning according to this principle.

This coder is connected to a multiplexer 1 and to elementary coders referenced from 2 to 8 of a two-dimensional transform type, more particularly cosine-transform type, as described for example, in the previously-quoted patent applications made by the Applicant. The multiplexer transmits the coded signals from the previously described subbands to a channel interface circuit 9, via buffer memories 10.

The VT signal is obtained by means of successive filtering of the HDP signal via filters 1, 12, 13, 14 connected in series in this order.

Filter 11 has the structure of a diagonal filter. It transforms the 144 MHz HDP signal into a 72 MHz quincuncial HDQ signal.

Filter 12 has the structure of an orthogonal filter. It transforms the HDQ signal into a 36 MHz orthogonal EDP signal.

Filter 13 has the structure of a diagonal filter. It transforms the EDP signal into an 18 MHz diagonal EDQ signal.

Finally, filter 14 has the structure of an orthogonal filter. It transforms the EDQ signal into a 9 MHz orthogonal VT signal.

The VT signal is applied at coder 2 input. The compressed signals are applied at input (a) of the multiplexer circuit 1.

The EDQ signal is decomposed into its two orthogonal components, by means of the orthogonal filter 14 and a subtractor circuit 15 which subtracts the components from the VT signal spectrum provided by the orthogonal filter 14 from the whole spectrum to form a lozenge representing the EDQ-signal band. The result of this subtraction is applied to coder 3 input after symbolized sub-sampling by the circuit 16. The signals compressed by the coder 3 are applied to input (b) of the multiplexer 1. The EDQ signal transmitted by the multiplexer 1 is formed by juxtaposing the VT signal provided by coder 2 and the signal provided by coder 3.

The EDP signal is formed by juxtaposing the EDQ signal and two orthogonal components obtained at the outputs of coders 4 and 5 respectively. Signals with an orthogonal spectrum structure are provided at the inputs of coders 4 and 5 respectively by an orthogonal filter 18 and a spectrum subtractor circuit 19 followed by sub-sampling circuits 21 and 22. A spectrum subtractor circuit 20 subtracts the orthogonal spectrum forming the EDP signal from the lozenge spectrum forming the EDQ signal provided by the diagonal filter 13. The resulting signal provided by the subtractor circuit 20 is applied, after sub-samplings by circuit 32, to the input of the orthogonal filter 18 and to the first input of the subtractor circuit 19 respectively. The result, after filtering provided by the orthogonal filter 18, is applied to the second subtractor circuit 19 input and, after sub-sampling by the circuit 21, to coder 4 input.

The HDQ signal is formed by juxtaposing the EDP signal and an orthogonal-structured spectrum signal provided by the coder 6. The signal which is applied at the input of coder 6 is obtained by filtering the HDQ signal via the orthogonal filter 12 and the subtractor circuit 23 followed by a sub-sampling circuit 24.

The HDP signal is formed by juxtaposing the HDQ signal and two orthogonal spectrum signals provided by the coders 7 and 8. These signals are obtained after filtering of the HDP signal via a diagonal filter 11, a subtractor circuit 25 of a sub-sampling circuit 29, an orthogonal filter 26, a subtractor circuit 27 and sub-sampling circuits 28 and 29. The subtracting circuit 25 subtracts the HDQ signal from the HDP signal. The result is applied, after sub-sampling by the circuit 29, to a first subtractor circuit 27 input and to the input of an orthogonal filter 26. The signal provided by the filter 26 is applied on the one hand, via a sub-sampling circuit 28, to coder 7 input and on the other hand, to a second subtractor circuit 27 input. The result of the subtraction made by the subtractor circuit 27 is applied, via a sub-sampling circuit 29, to the input of coder 8.

Figure 9:
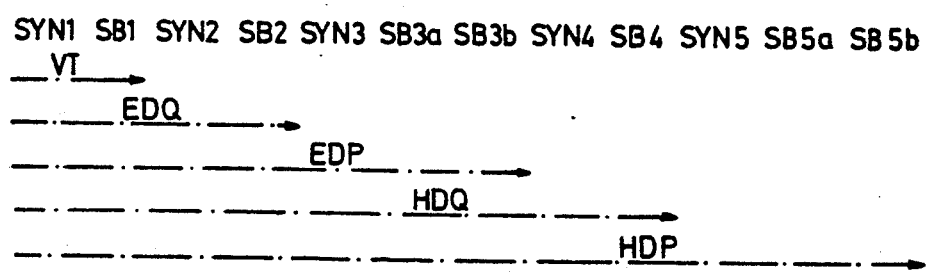
FIG. 9, the transmission mode used by the invention to transmit sub-images of different resolutions.

The coding device in FIG. 8 enables the different sub-images to be transmitted in multiplex form according to FIG. 9. In this manner, for example, for each image zone described by a defined group of lines, N, (8 lines, for example) from the SB1 band of signal VT transmission, there exist N=8 lines in subbands SB2, SB3a, SB3b which are required to transmit signals HDQ and HDP, and 2N=16 lines in subbands SB4, SB5a, SB5b which are required to transmit HDQ and HDP signals. The divisions within each subband are known to the channel interface circuit 9 by means of non-imitable synchronizing signals SYN1 to SYN5, in other words, so that they cannot be imitated by any concatenation of other transmitted codes. The description of subbands SB1 to SB5b is inserted between these synchronizing patterns so that when the information between synchronizing patterns SYN1 and SYN2 is decoded it is possible to reconstitute the VT resolution signal corresponding to subband SB1; if the information is decoded up to synchronizing pattern 3 it is possible to constitute the EDQ resolution signal formed by juxtaposing SB1 and SB2 spectrums and so on. This device enables receiver-decoders to synchronize with respect to non-imitable patterns SYN1 to SYN5 in order to select, without the need for further operations, the signals it is able to decode to reconstitute a video signal from any of the previously described resolutions.

Figure 10:
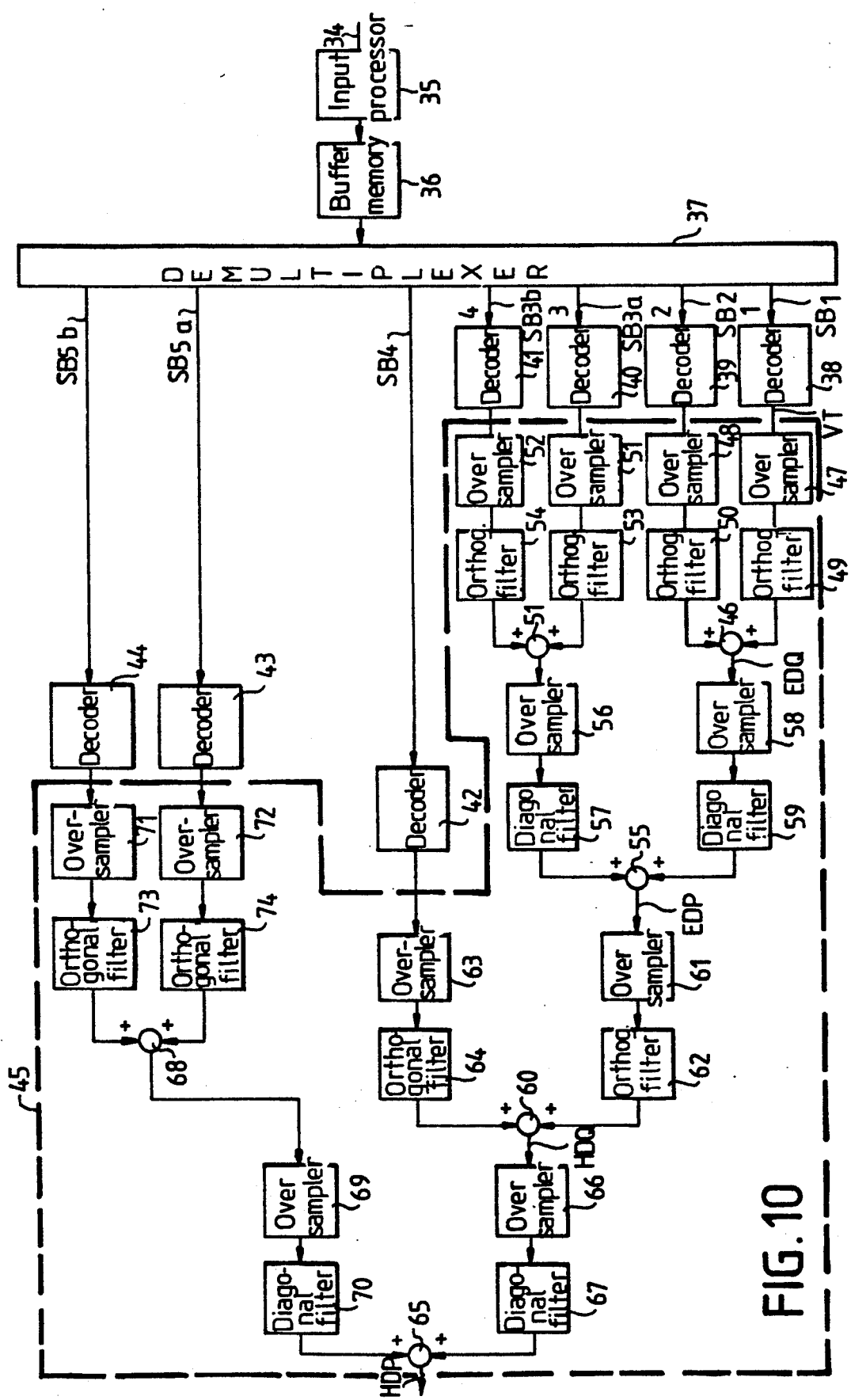
FIG. 10, a mode of embodiment of a decoding architecture according to the invention.
Figure 13:
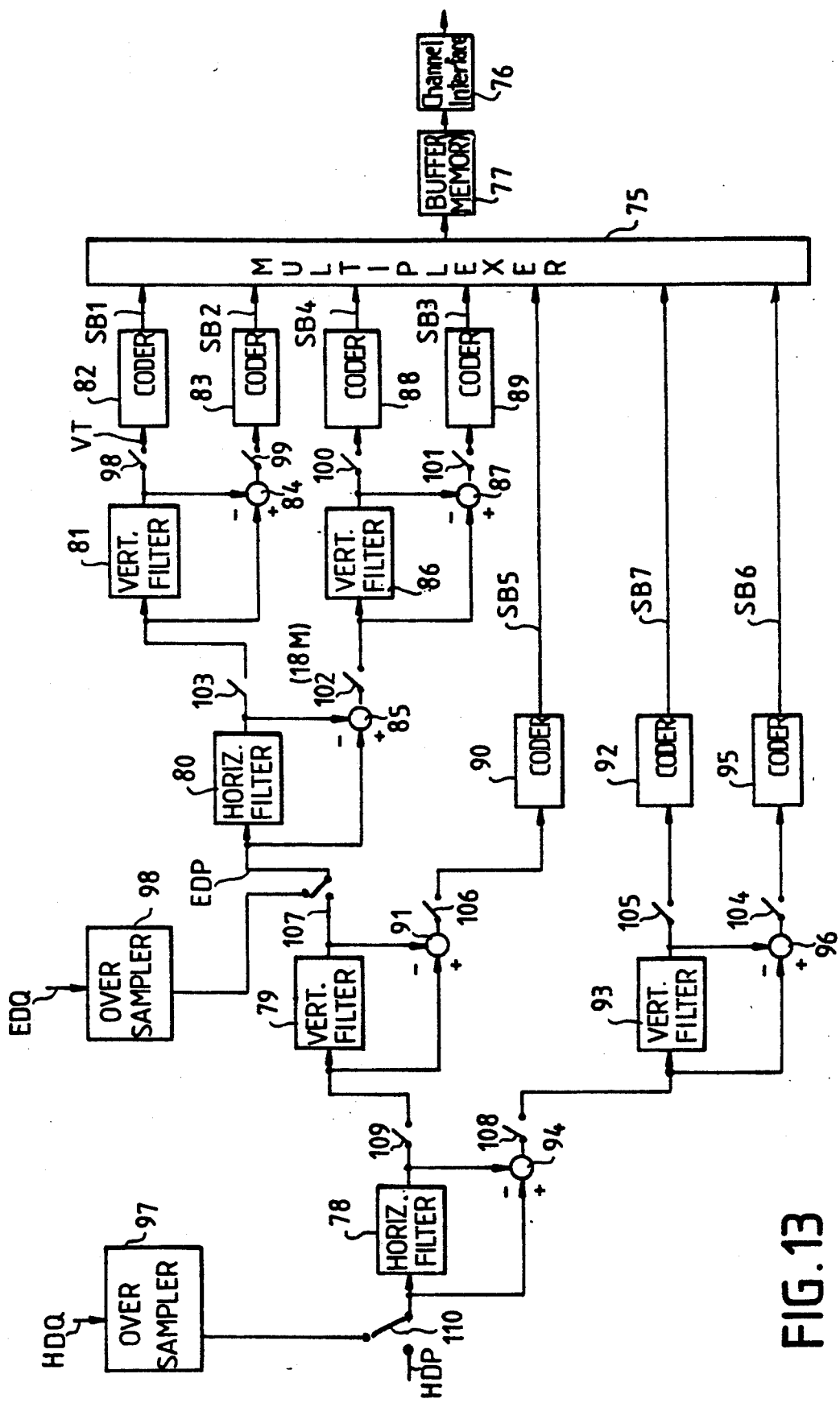

An example of an embodiment of a corresponding type of compatible decoder is presented in FIG. 10. In this example, the signals emanating from the channel transmission are applied at input 34 of the decoder after having passed via an input processor 35 which detects the synchronizing patterns SYN in order to isolate the information to be decoded in the previously described manner. Only those signals belonging to the subband corresponding to the resolution authorized by that particular decoder are transferred to a buffer memory 36 and are then decoded by the decoding motor consisting of 7 elementary decoders of cosine-transform type, reference numbers 38 to 44 and a subband assembly device 45, corresponding to the assembly illustrated within the dashed line, used to reform the signal by means of an inverse process of filtering/sub-sampling carried out by the coding device in FIG. 8.

The VT signal is reconstituted by means of decoder 38 using the subband signal SB1.

The EDQ signal emanates from the decoding of signals in subbands SB1 and SB2 using decoders 38 and 39 and from the regrouping of decoded signals using elements 46 to 50 of the regrouping device. The elements 46 to 50 comprise a circuit adder 46, a first and second over-sampling circuit 47, 48, and a first 49, and a second, 50, orthogonal filter. The circuit adder 46 reconstitutes the EDQ signal by adding the signals provided by decoders 38 and 39, which have been shaped correctly via the first and second over-samplers 47 and 48 and filters 49 and 50.

In an equivalent fashion, the signals from subbands SB3a and SB3b are applied to an adder circuit 51 at two inputs, after decoding using decoders 40 and 41, and after transformation in over-sampling circuits 51 and 52, and filtering using orthogonal filters 53 and 54. These signals which are obtained at the outputs of the adder circuits 51 and 46 are then applied at two operand inputs of an adder circuit 55 via either an over-sampling circuit 56 and a diagonal filter 57, or an over-sampling circuit 58 and a diagonal filtering circuit 59. The EDP signal is obtained at the adder circuit 55 output.

Still in a similar manner, the HDQ signal is obtained at the output of the adder circuit 60 by adding the EDP signal, shaped by an over-sampling circuit 61 and an orthogonal filter 62, to the signal in subband SB4, decoded by decoder 42 and shaped by an over-sampling circuit 63 and an orthogonal filter 64.

The HDP signal is obtained at the adder circuit 65 output, after addition of an HDQ signal, shaped by an over-sampling circuit 66 and a diagonal filter 67 and a signal provided by an adder circuit 68, shaped by an over-sampling circuit 69 and a diagonal filter 70. The adder circuit 68 adds together signals from subbands SB5a and SB5b, which are decoded by means of decoders 43 and 44 after shaping by over-sampling circuits 71 and 72, and orthogonal filters 73 and 74.

The recombining process performed by the decoder in FIG. 10 is the precise opposite of that used for subband decomposition applied at the coder level in FIG. 8. It simply consists in over-sampling and then filtering subbands before adding them, according to a well-known principle of the interpolation theory. With a number of successive recombinations, the decoding motor in FIG. 10 enables the reconstitution of all the intermediate signals, previously described, up to the HDP signal. To give an example, a decoding motor limited to EDP resolution will not be equipped with all the functions illustrated in FIG. 1, but only those required for decoding subbands SB1, SB2, SB3a and SB3b. However, this type of decoder, inspite of the fact that it receives a compressed signal of extremely high resolution, will be able to decode it and display it on an EDP-type resolution screen. This is possible due to the input processor (35) which only retains signals relative to subbands SB1 to SB3b which it transfers into the memory 36 and which are then the only signals to be decoded. Recombining these sub-bands constitutes an EDP signal with a resolution lower than that of the original signal, but which represents the low spatial frequencies of the same image.

Another point of interest of the decoding device which has just been described, is that it provides a solution to the problems related to the fast forward and rewind functions of videorecorders. Incorporating a decoding device may provide a solution, more particularly in the case where recording onto a magnetic tape of a videorecorder is carried out so that two channels can be distinguished by means of an interlacing process, for example. The first channel records the signal as it is coded for distribution, and the second channel is used for the rapid seeking of images on the tape. This second channel must be physically installed on the tape at a place of easy access even when the tape is being wound at high speed. The signal placed on the channel is preferably a reduced resolution signal, for example, with a resolution equal to that of the VT signal. This signal is obtained by decoding and then coding the signal which is present at the videorecorder input, which is encoded according to the distribution coding described in this invention. The value of this code converting is that it is not very expensive, as only a low-resolution coding-decoding device is required. Moreover, this coding also presents the advantage in that it does not use temporal recursivity and that it has a steady output rate. Thus, an image always presents the same number of bits and occupies a constant, perfectly identifiable location on the band.

A first variation on the embodiment of this invention is described hereafter, and illustrated by FIGS. 11 to 15. This version of the embodiment only uses separable orthogonal filters (in other words, filters consisting of vertical filters and horizontal filters). In this version, the HDP signal is decomposed according to FIGS. 11 and 12, into several subbands obtained by orthogonal filters. The HDP signal is first decomposed into an EDP signal and subbands SB5, SB6, SB7, corresponding respectively to high vertical spatial frequencies/low horizontal frequencies, high vertical frequences/high horizontal frequencies, low vertical frequencies/high horizontal frequencies.

By means of this principle, the EDP band is divided into one SB1 subband (VT signal), and SB2, SB3 and SB4 subbands. The embodiment of a coder in accordance with this method is presented in FIG. 13.

This coder is based on a multiplexer 75 which transmits coded signals to a channel-interface circuit 76, via a buffer memory 77; the coded signals correspond to the previously described subbands.

The VT signal is obtained by means of successive filtering of the HDP signal via horizontal and vertical filters 78 to 81, placed alternately in series in this order. The output of the vertical filter 81 is connected to the input of coder 82 which provides a VT signal in the SB1 subband. The signal in subband SB2 is provided by coder 83. The input of this coder is connected to the output of a subtractor circuit 84 for which the two operand inputs are connected respectively to the input and output of the vertical filter 81. The subtractor circuit 84 thus provides coder 83 input with the vertical components of the signal spectrum which is applied at the vertical filter 81 input and which define the SB2 subband. Similarly, the vertical spatial components of the EDP signal spectrum which is applied at the horizontal filter 80 input are obtained at the subtractor circuit 85 output, which is connected by both operand inputs respectively to the input and the output of the horizontal filter 80. The result of the subtraction performed by the subtractor circuit 85 is applied, on the one hand, to the input of vertical filter 86, and on the other, to the first operand input of the subtractor circuit 87, for which the second operand input is connected to the output of the vertical filter 86. The vertical filter 86 provides the input of coder 88 with the filtered vertical components of the signal obtained at the subtractor circuit 85 output. The coded signal at the output of coder 88 is coded in the SB4 subband. The signal obtained at the output of subtractor circuit 87 is applied to the input of coder 89 and the coded result is transmitted in subband SB3. The signals sent by coders 88 and 89 together with the signals provided by coders 82 and 83 form and EDP signal.

The coded signal in subband SB5 is coded by the coder 90 which codes signals provided by a subtractor circuit 91 for which the two operand inputs are connected respectively to the input and output of the vertical filter 79.

The coded signal in subband SB7 is obtained at the output of coder 92 for which the input is connected to the output of a vertical filter 93. The input of this vertical filter 93 is connected to the output of a subtractor circuit 94 for which both operand inputs are connected respectively to the input and the output of a horizontal filter 78. The coded signals in the SB6 band are provided by a coder 95, for which the input is connected to the output of a subtractor circuit 96. The subtractor circuit 96 has both operand inputs connected respectively to the input and output of the vertical filter 93.

When subbands SB5 and SB7 are juxtaposed with the EDP signal transmitted in subbands SB1 to SB4, the previously mentioned HDQ signal is obtained. In the same way, when the signal emitted in the SB6 subband is juxtaposed with the HDQ signal emitted from the juxtaposing of subbands SB1 to SB7, then the HDP signal is reconstituted in the manner illustrated in FIG. 12.

However, this variation on the embodiment of the invention does not produce the quincuncial HDQ and EDQ standards automatically, due to the fact that neither a diagonal filter nor a transfer grid for orthogonal/quincuncial sampling is used. For this reason, this variation does not fully correspond to the compatibility required between orthogonal sampled signals, types HDP, EDP and VT and quincuncial sampled signals, types HDQ and EDQ. This problem may however be solved by over-sampling quincuncial-form signals by means of over-sampling circuits 97 and 98, before applying them to the coder input in FIG. 13 according to an orthogonal grid of the same type as that presented in FIG. 14, so that HDQ and EDQ signals are converted respectively into HDP and EDP standards. Sub-sampling circuits numbered respectively 98 to 110 are placed at the coder inputs to enable juxtaposing of subbands SB1 to SB7.

Figure 15:
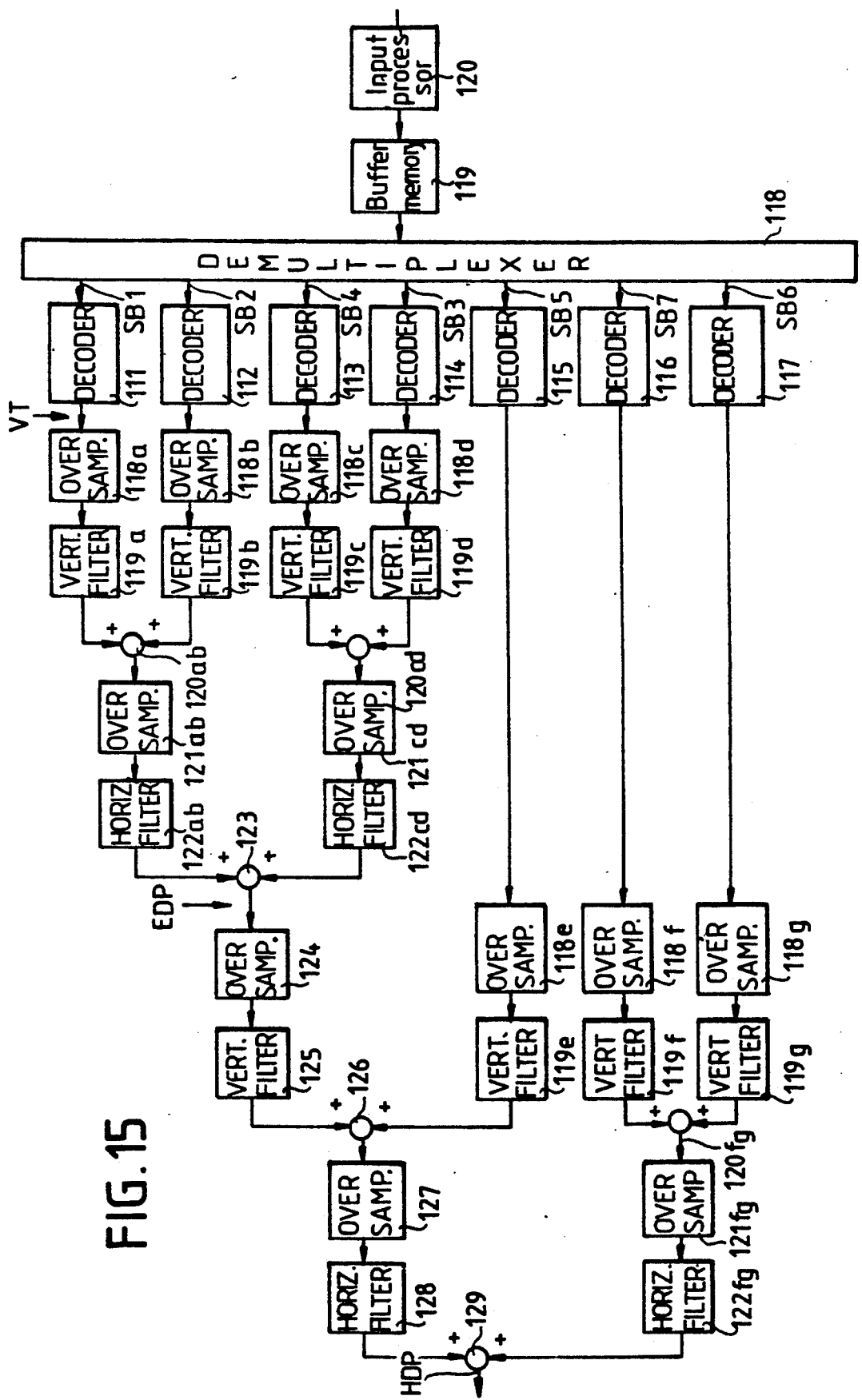
FIG. 15, an embodiment of a decoder corresponding to the decompositions in FIGS. 11 to 13.

A decoder corresponding to the first variation of the embodiment of this invention is presented in FIG. 15. This decoder carries out the inverse functions of the coder in FIG. 13. It comprises a group of decoding blocks, numbered respectively 111 to 117, and enables the decoding of the signals transmitted in subbands SB1 to SB7. These signals are transmitted to the input of decoders 111 to 117 in a similar manner to the decoding device illustrated in FIG. 10, in other words, via a multiplexing circuit 118, a buffer memory 119 and an input processor 120. These signals which are provided by each decoder are first of all over-sampled by means of over-sampling devices, numbered respectively 118a to 118g, then filtered vertically using vertical filters numbered respectively 119a to 119g. The adder circuits 120ab, 120cd and 120fg carry out respectively the addition of the signals provided by the vertical filters 119a, 119b, 119c, 119d, 119f, 119g. The signals produced by the adder circuits are, in turn, over-sampled by the over-sampling devices and numbered respectively 121ab, 121cd and 121fg, then filtered horizontally using horizontal filters numbered respectively 122ab, 122cd and 122fg. The signals produced by the horizontal filters 122ab and 122cd are then added in an adder circuit 123 which provides at its output the EDP signal. This EDP signal is then, in turn, over-sampled by an over-sampling circuit 124, then filtered vertically by means of a vertical filter 125 in order to be finally added by an adder circuit 126 to the result of filtering carried out by the vertical filter 119e. The result of this addition, performed by the adder circuit 126 is over-sampled by over-sampling circuit 127 then filtered using the horizontal filter 128. The result of the horizontal filtering by horizontal filter 128 is added to the result of the filtering by horizontal filter 122fg in an adder circuit 129 in order to form the HDP signal.

In the embodiment mode illustrated in FIG. 15, the compatible decoding of VT and EDP signals does not impose the use of the total decoding device of the HDP signal. The HDQ signal can be obtained from the HDP signal, however, the subband SB6 which represents the frequencies missing from the HDQ spectrum does not require decoding. Similarly, the EDQ signal can be obtained from the EDP signal, without it being necessary to decode the signal produced by the SB3 subband. This leads, in the case of an HDQ or EDQ decoder, to an HDP or EDP-type decoder, but less the relative decoding of the SB6 or SB3 subband.

It is obvious that the modes of embodiment of the invention that have just been described are not unique. A second variation on the embodiment of the invention can consist in using a different method to obtain the decomposing of the high-definition signal into subbands of differing resolutions, while keeping the previously described multiplexing for the generation of binary streams. With respect to the article written by J. M. ADANT et al. entitled "Block operations in digital signal processing with application to TV coding" - Signal Processing - pages 385-397, 1987, it is still possible to consider that a semi-band filtering and a decimation of a two-dimensional two to one ratio is sufficient in order to pass from HDP format to EDP format and may be obtained in the manner illustrated in FIG. 16. In the case of image compression systems using the cosine transform, this possibility makes it easy to obtain downward compatibility. In fact, to dispose of several levels of compatibility, it is sufficient to define sub-blocks imbricated in the manner described in FIG. 17.

Compatibility between systems is obtained by slightly modifying the normal field scan of cosine transform coefficient blocks in order to extract, first of all, the sub-block with the smallest dimensions, 4×4 (8×8), for example, followed by the other blocks. An example of modified field scanning is given in FIG. 17.

The sequential information obtained after scanning can then be integrated in the previously described multiplexing structure to the extent that formats are limited to orthogonal VT, EDP and HDP formats. The subbands SB1 to SB6 are then defined by the scanning of the cosine transform coefficients in the following manner:

| | |
|---|---|
| SB1 | coef. 1 ... coef. 4 |
| SB2 + SB4 + SB3 | coef. 5 ... coef. 16 |
| SB5 + SB7 + SB6 | coef. 17 ... coef. 64 |

What is claimed is:

1. A method for information compression intended for compatible decoding of a group of television signals with increasing resolutions, the signals being transmitted between at least a transmitting coder and a receiving decoder, comprising the steps of:

at the transmitting coder
strobing the spatial frequency band of the signals with the highest resolution which is to be transmitted into adjacent subbands to generate a plurality of resolution groups, each resolution group representing a complete television signal of a predetermined resolution, wherein the subbands are divided by means of diagonal and/or orthogonal spatial filters;
coding the signals independently in each subband;
multiplexing the subbands by separating the coded signals in each subband according to non-imitable synchronization patterns;
and at each receiving decoder decoding the signals which are received relative to each subband, only taking into consideration those which are necessary to reconstitute at least one member of the groups of resolution.

2. The method according to claim 1 wherein the coding and decoding of each subband uses a cosine-type two-dimensional transformation.

3. The method according to either of claims 1 or 2, wherein the subbands are divided by scanning or imbricated sub-blocks of cosine transformation sued to code the highest resolution signal.

4. The method according to either of claims 1 or 2, wherein the television signal with the highest resolution is a high-definition signal with 1920 points per line and 1152 lines.

5. The method according to claim 4, wherein the resolution groups comprise:
 a first resolution group defined by 960 points per line and 1152 lines;
 a second resolution group defined by 960 points per line and 576 lines;
 a third resolution group defined by 480 points per line and 576 lines;
 a fourth resolution group defined by 480 points per line and 288 lines.

6. The method according to claim 5, wherein spectral field described by the first, second and fourth resolution groups can be represented by means of rectangles in an orthonormal, two-dimensional space, with horizontal spatial frequencies of signals plotted on an x-axis in relation to cycles per image width, and vertical spatial frequencies of signals on a y-axis in relation to cycles per image height.

7. The method according to claim 5, wherein the first and third resolution groups have spectral fields which can be represented by lozenges in a two-dimensional, orthonormal space.

8. The method according to claim 5, wherein, to make fast forward and rewind functions of a videorecorder possible, it is necessary to record directly onto a magnetic tape of the videorecorder, the coded signals received from the transmitting coder, and to decode the received signals simultaneously according to the fourth resolution group before recording them in parallel with the coded signals produced by the transmitting coder onto the magnetic tape.

9. The method according to either of claims 1 or 2, wherein the coder comprises a group of horizontal and/or diagonal and/or vertical filters connected to a group of elementary coders and to a multiplexer for separating the coded signals into each subband using non-limitable synchronizing patterns.

10. The method according to claim 9, wherein each decoder comprises an input processor used to decode the synchronizing patterns and to select the frequency bands which correspond to the resolution group which the decoder can restitute.

11. The method according to claim 8, wherein the videorecorder comprises a decoder used to decode a low-resolution frequency subband in the signal presented at the videorecorder input, and which is then coded according to an algorithm adapted to quick seeking of images recorded on the magnetic tape.

* * * * *